United States Patent [19]

Mauthe

[11] Patent Number: 5,069,336

[45] Date of Patent: Dec. 3, 1991

[54] CONTAINER HAVING COMPONENTS IN SEALABLE BLIND BORES FOR ANCHORING FASTENING ELEMENT

[75] Inventor: Peter Mauthe, Türkheim, Fed. Rep. of Germany

[73] Assignee: Hilti Aktiengesellschaft

[21] Appl. No.: 578,784

[22] Filed: Sep. 6, 1990

[30] Foreign Application Priority Data

Sep. 6, 1989 [DE] Fed. Rep. of Germany ........ 3929603

[51] Int. Cl.⁵ .............................................. B65D 81/32
[52] U.S. Cl. .................................... 206/219; 220/507; 405/259.6
[58] Field of Search ............................... 206/219–222, 206/568; 220/507, 523; 405/261

[56] References Cited

U.S. PATENT DOCUMENTS

| | | | |
|---|---|---|---|
| 3,091,091 | 5/1963 | Ferrante | 206/219 |
| 3,670,918 | 6/1972 | Mitchell | 220/507 |
| 4,105,114 | 8/1978 | Knox et al. | 405/261 |
| 4,341,301 | 7/1982 | Meyer et al. | 206/219 |
| 4,366,641 | 1/1983 | Price et al. | 220/507 |
| 4,372,708 | 2/1983 | Bower, Jr. et al. | 206/219 |
| 4,497,403 | 2/1985 | Rausch | 405/261 |
| 4,651,875 | 3/1987 | Lang et al. | 405/261 |
| 4,706,806 | 11/1987 | Mauthe | 405/261 |
| 4,729,696 | 3/1988 | Goto et al. | 405/261 |
| 4,894,269 | 1/1990 | Kimura | 405/261 |

FOREIGN PATENT DOCUMENTS

| | | | |
|---|---|---|---|
| 1935150 | 1/1971 | Fed. Rep. of Germany | 405/261 |
| 2412410 | 9/1975 | Fed. Rep. of Germany | 206/219 |
| 1323113 | 7/1973 | United Kingdom . | |

Primary Examiner—Jimmy G. Foster
Attorney, Agent, or Firm—Toren, McGeady & Associates

[57] ABSTRACT

A container for a hardenable multicomponent mass, used in anchoring a fastening member in a bore hole, has blind holes forming chambers. The chambers extend axially and are parallel to one another. The blind holes are arranged to receive individual components of the multicomponent mass. The container is formed of a destructable material, preferably a ceramic. When the container is broken or destroyed, the components mix to form the hardenable mass. The open ends of the blind holes are sealed by a cover after the components are filled into the chambers. The cover is located at an end face of the container.

7 Claims, 1 Drawing Sheet

CONTAINER HAVING COMPONENTS IN SEALABLE BLIND BORES FOR ANCHORING FASTENING ELEMENT

BACKGROUND OF THE INVENTION

The present invention is directed to a container holding a hardenable multicomponent mass used for anchoring a fastening element in a bore hole. The container has at least two closed chambers separated from one another for holding the individual components.

Two basic systems are known for anchoring fastening members or elements by means of a hardenable multicomponent mass. In one system, used primarily in a receiving material containing cavities, the components are squeezed by a metering device from large cartridges containing sufficient mass for anchoring several fastening elements, with the components being mixed together and introduced into the bore hole. Such a solution is very economical. It requires, however, a special metering device and there is the possibility of metering errors, whereby too little or too much of the mass is introduced into the bore hole.

In the second system, as disclosed in DE-A 3 416 094, the components for a single attachment are preproportioned and arranged in separate chambers of a container. In use, the container is introduced into the bore hole. The container consists mainly of a first part for one component and at least a second part for another component. The second part can be positioned within the first part or, as disclosed in DE-B 1 935 149, can be located outside the first part. The walls of the container are formed of a destructible material, preferably glass or plastic. The plastic material can be flexible foils or hard brittle materials. In addition to the components, the chambers can also hold more-or-less large portions of filler materials. The chambers can be sealed, such as by fusion welding or by other means such as covers, plugs or the like.

The fabrication and filling of such containers is quite expensive. Further, containers formed of glass can be prematurely damaged or destroyed during transport or handling. If glass or transparent plastics are used, there is the additional problem of aging of the components, due to the effects of exposure to light.

SUMMARY OF THE INVENTION

Therefore, the primary object of the present invention is to provide a container for hardenable multicomponent masses which is easy to manufacture, sensitive to external conditions, and secure and safe in use.

In accordance with the present invention, the container body is formed of a destructible material with chambers for the components, with the chambers extending axially and parallel to one another.

Accordingly, the container has several separate chambers for the individual components. After the destruction of the container in a bore hole, the fragments of the container serve as filler for the hardenable multicomponent mass.

The arrangement of the chambers in the container body simplifies both fabrication and filling with the components. Depending on a predetermined ratio of the components, the chambers can be of equal or different sizes. To afford a good distribution of the components, they can be placed in several chambers. To provide different mixture ratios, the components can be filled into the chambers in different quantities.

The chambers are arranged as sealable bores, so that they can be easily manufactured and then sealed in a simple manner by plugs or the like. Chambers in the form of bores can be arranged relatively close to one another without weakening the container body.

Preferably, the chambers are formed as sealable blind or dead-end holes, that is, the chambers have only one opening. Such an arrangement has the advantage that only one end of the chamber needs to be sealed, and, in addition, the fabrication of the container is simplified. By differing the depths or axial lengths of the blind holes, a specific distribution of the components along the axis of the container can be achieved. For example, the container may have a higher hardener concentration at its trailing end so that a quicker hardening or curing of the components in the bore hole is effected in the trailing end region and any outflow from the bore hole of the mass not yet hardened is prevented.

In one embodiment, the chambers can be individually sealed after being filled with the components. In addition, it is possible that at least one end of the container body can be provided with a cover or lid for sealing the chambers. The cover or lid simultaneously closes or seals a number or all of the chambers. The cover or lid can be glued to the end of the container body or it can be shaped to fit into the end of the container body. Plugs for the individual chambers can be provided on an inner side of the cover or lid. Such plugs can, at the same time, serve as a snap-in device for securing the cover to the container body. In case the container body has chambers open at both ends, initially, a first cover is placed at one end face and, after the chambers have been filled, a second cover is placed at the opposite end. Where the chambers are formed as blind holes, the holes can extend from both ends of the container body, can be separately filled with components, and sealed by covers. For securing or anchoring fastening members in bore holes of different depths, it is advantageous to provide the container body at its ends with means for securing an additional container body for extending the axial length of the container. Depending of the desire depth of penetration of the fastening member in the bore hole, several container bodies or sections can be connected into a elongated container. The means for connecting the individual container bodies or sections can be threads or snap-in elements. The container sections can be connected to one another after the chambers have been filled by the user, or during manufacture before the chambers are filled.

Preferably, the container body is circular in transverse section and thus has the shape of a cylinder. It is advantageous that the external diameter of the cylinder corresponds approximately to the diameter of the bore hole in the receiving material. If necessary, known retention means can be used, such as lugs, lips or the like, provided on the outside surface of the container to prevent it from sliding out of an upwardly oriented bore hole, such as in a roof.

In another embodiment, it is possible to shape individual container bodies as circular sectors in transverse section. Several such container bodies can be combined to form a circular container in transverse section. The filling of the chambers with the components can be effected before or after the individual container bodies are combined into a common body.

In a preferred embodiment, the container body is formed of a ceramic material, earthenware or the like can be used for this purpose. Such materials are impermeable to light and protect components from exposure to light in the surrounding environment. Ceramic materials are brittle and can be relatively easily destroyed in a bore hole.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
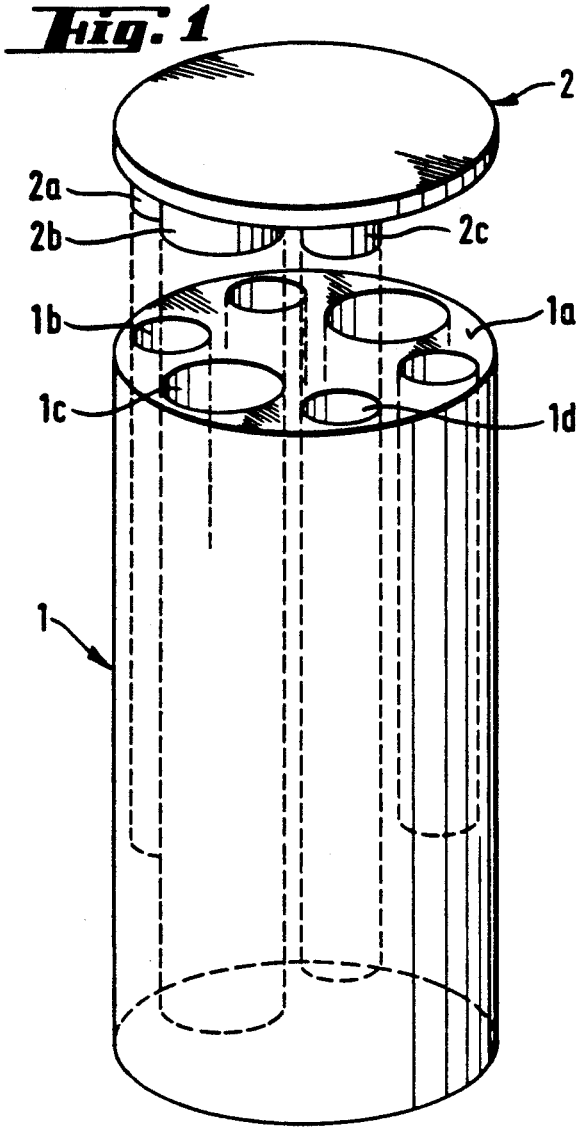
FIG. 1 is a perspective view of a container embodying the present invention with a cover shown spaced from the end of the container.

In FIG. 1 the container is a cylindrically shaped member or body 1 provided with a number of blind holes 1b, 1c, 1d extending from one end face 1a toward the other end face. The container is axially elongated and the holes 1b, 1c, 1d extend parallel to one another and to the axis of the container The blind holes 1b, 1c, 1d form chambers for holding components of a hardenable multicomponent mass. The volume of the individual holes 1b, 1c, 1d correspond to the mixing ratio of the components of the hardenable mass. In use, it would be possible to leave some of the holes 1b, 1c, 1d empty. The open ends of the holes or chambers 1b, 1c, 1d are sealed by a cover or lid 2 after the chambers are filled with the components. Cover or lid 2 has plugs 2a, 2b and 2c extending from the surface facing the container for closing the individual chambers 1b, 1c, 1d so that the cover 2 snaps into the container. The container body 1 is formed of a ceramic material, such as porcelain or earthenware. After the container 1 is inserted into a bore hole, it is broken up or destroyed mainly by rotating and driving a fastening member or anchor rod into the bore hole so that the components of the hardenable mass are mixed together and harden for securing the fastening member. The broken up parts of the container 1 serve as filler in the hardenable mass. As an example, the components can be resins and hardeners or a mixture of water and cement. In addition, a combination of resin and hardener along with cement and water can be arranged in the blind holes 1b, 1c, 1d so that an organic and an inorganic hardening or curing system is provided next to one another.

Figure 2:
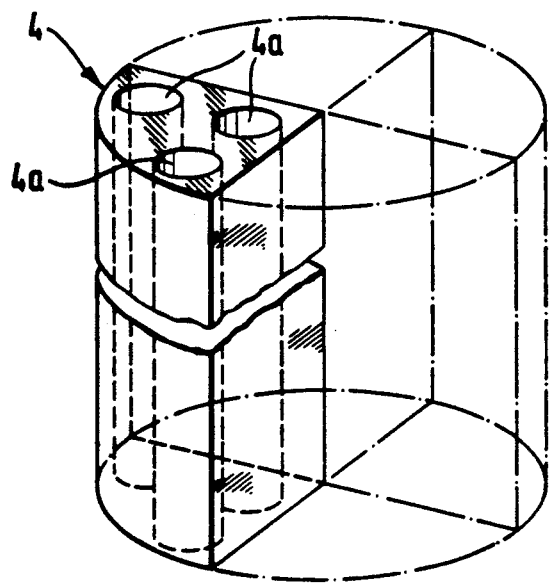
FIG. 2 is another embodiment of a container in accordance with the present invention, shown in perspective.

In FIG. 2 a container body or section 4 is formed as circular sectors as viewed in section transverse to the axial direction. Each of the container sections 4 is provided with bores 4a for holding the components of a hardenable multicomponent mass. The bores 4a extend for the full length of the container sections 4 and can be sealed on the ends after the components are introduced. Several of the container sections 4 in the configuration as shown in FIG. 2 can be combined into a cylindrically shaped container. The individual sector shaped container sections 4 can be filled with the components and subsequently combined as required.

Figure 3:
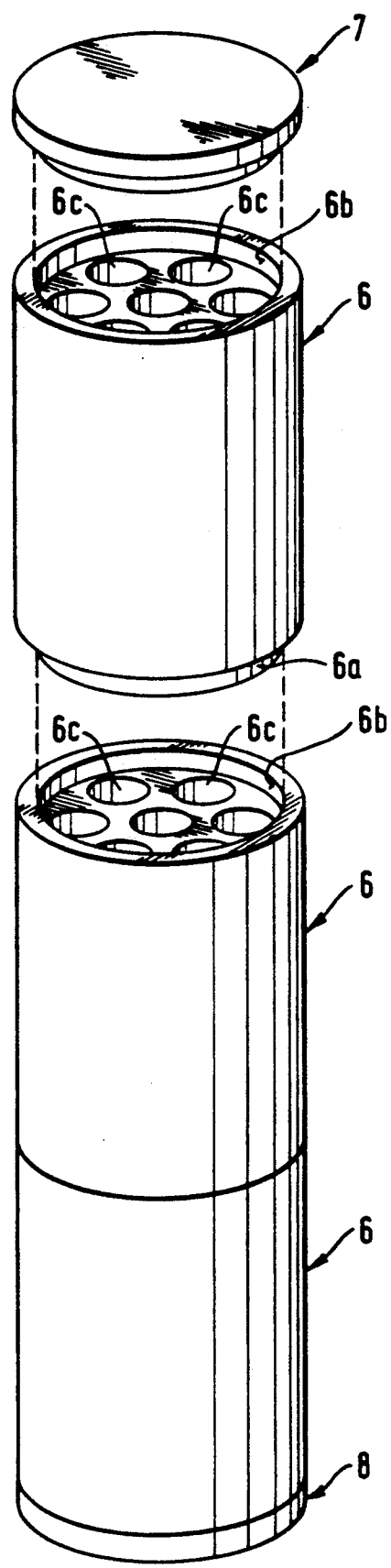
FIG. 3 is a further embodiment of a container incorporating the present invention shown in perspective with a container section spaced from interconnected container sections and with a cover spaced from one end of the container.

In FIG. 3, a number of container sections 6 are shown with connection means at their end faces for interconnecting the container sections 6. The connecting means are provided by a reduced diameter projection 6a on one end and a recess 6b of similar diameter on the opposite end so that the container sections 6 can be plugged together forming an axially elongated container. The container sections 6 have axially extending bores 6c forming chambers for receiving components of a multicomponent mass. The bores 6c can be filled with the components after the individual sections are plugged together or can be filled in common after the container sections have been plugged together and arranged with the bores 6c in register. After filling the bores 6c, the end container sections 6 can be sealed by covers 7, 8. By plugging several container section 6 together, the required quantity of the hardenable mass can be placed in the bore holes adapted to the required depth of embedment of an anchor rod or fastening element into a bore hole.

While specific embodiments of the invention have been shown and described in detail to illustrate the application of the inventive principles, it will be understood that the invention may be embodied otherwise without departing from such principles

I claim:

1. A container for a hardenable multi component mass used in anchoring a fastening member in a bore hole, said container has an axial direction with at least two closed chambers, said chambers being separate from one another and arranged to hold an individual component of the multicomponent mass, wherein the improvement comprises that said container comprises a container body formed of a destructible material, said chambers are formed by said container body and have axes extending approximately parallel to the axial direction and to one another, said chambers and the axes thereof are in spaced relation, and said chambers are formed as sealable blind bores in said container body.

2. A container, as set forth in claim 1, wherein a cover is provided at least at one end of the said container body for sealing the chambers therein.

3. A container, as set forth in claim 1, wherein said container body is formed of a plurality of container sections extending in the axial direction each having end faces and said container sections being connected together at said end faces.

4. A container, as set forth in claim 1, wherein said container body is circular in cross section transverse to the axial direction.

5. A container, as set forth in claim 1, wherein said container body is formed of a plurality of container sections each having a circular sector shaped cross section transverse to the axial direction.

6. A container, as set forth in claim 1, wherein said container body is formed of a ceramic material.

7. A container, as set forth in claim 1, wherein said container body is a unitary solid member.

* * * * *